United States Patent [19]

Nakano et al.

[11] 4,194,820
[45] Mar. 25, 1980

[54] SPRING SERVO TYPE APERTURE CONTROL DEVICE IN A CAMERA

[75] Inventors: Yoshiyuki Nakano; Akihiko Sato; Yoshitaka Araki, all of Tokyo, Japan

[73] Assignee: Nippon Kogaku K.K., Tokyo, Japan

[21] Appl. No.: 950,685

[22] Filed: Oct. 12, 1978

[30] Foreign Application Priority Data

Oct. 17, 1977 [JP] Japan ................................ 52/123589

[51] Int. Cl.[2] ........................... G03B 7/08; G03B 9/02
[52] U.S. Cl. ....................................... 354/43; 354/271
[58] Field of Search ....................... 354/36, 38, 40, 42, 354/43, 45, 270, 271, 44

[56] References Cited

U.S. PATENT DOCUMENTS

| | | | |
|---|---|---|---|
| 3,922,697 | 11/1975 | Wasaske | 354/38 X |
| 3,927,415 | 12/1975 | Petersen | 354/43 X |
| 4,129,877 | 12/1978 | Yamamichi et al. | 354/271 |

*Primary Examiner*—L. T. Hix
*Assistant Examiner*—William B. Perkey
*Attorney, Agent, or Firm*—Fitzpatrick, Cella, Harper, Scinto

[57] ABSTRACT

A spring servo type aperture control device in a camera having mounted thereon a lens comprises: an aperture mechanism including an aperture blade and determining the aperture by varying the position of said aperture blade, an aperture lever connected to said aperture mechanism and displaceable between a first position for rendering said aperture blade to an open aperture and a second position for rendering said aperture blade to a minimum aperture, and a member for biasing said aperture lever toward said second position, said aperture control device comprising: a control member engaged with said aperture lever and movable between a third position and a fourth position corresponding to said first position and said second position, respectively, a spring member storing a drive force by shutter charge and giving forth the stored drive force by shutter release, a cam member disposed between said control member and said spring member and rotatable by the drive force of said spring member upon shutter release to drive said control member at a uniform velocity from said third position to said fourth position, said aperture lever stopping down the aperture in response to the movement of said control member from said third position to said fourth position, metering means including an electromagnetic means for blocking the movement of said control member when the quantity of light transmitted through the aperture being stopped down has reached a predetermined value, and a member adapted to return said control member to said third position after completion of exposure.

2 Claims, 3 Drawing Figures

SPRING SERVO TYPE APERTURE CONTROL DEVICE IN A CAMERA

BACKGROUND OF THE INVENTION

1. Field of the Invention

This invention relates to an aperture control device in a camera, and more particularly to an aperture control device having, on the lens barrel side, an aperture mechanism for controlling the aperture diameter and a spring for biasing the mechanism from an open aperture condition in a stop down direction and in which a member on the camera body coupled to the aperture mechanism releases, in response to shutter release operation, the restraint of the aperture mechanism set to the open aperture condition to thereby cause the aperture mechanism to effect stop down operation by the use of the force of the spring and restrain the operation of the aperture mechanism using the force of the spring at a point of time whereat a predetermined aperture opening has been obtained.

2. Description of the Prior Art

A device of the described type is known in which an escape wheel is brought into mesh-engagement with a gear in the camera operable with an aperture mechanism so as to ensure that the operation of the aperture mechanism takes place at a uniform velocity even if the force of the spring for driving the aperture mechanism within the lens barrel is varied as by interchange of the lens.

However, the use of an escape wheel in such device to control the aperture mechanism to operate at a uniform velocity leads to great noise given out during photography.

SUMMARY OF THE INVENTION

It is an object of the present invention to eliminate the above-noted disadvantage and to provide an aperture control device in a camera in which no great noise occurs and yet the aperture mechanism can be controlled to a uniform velocity.

Such an object of the present invention can be achieved by constructing, in a camera having mounted thereon a lens having an aperture mechanism including an aperture blade and determining the aperture by varying the position of the aperture blade, an aperture lever connected to the aperture mechanism and displaceable between a first position for rendering the aperture blade to an open aperture and a second position for rendering the aperture blade to a minimum aperture, and a member for biasing the aperture lever toward the second position, an aperture control device comprising a control member engaged with the aperture lever and movable between a third position and a fourth position corresponding to said first position and said second position, respectively, a spring member storing a drive force by shutter charge and giving forth the stored drive force by shutter charge, a cam member disposed between the control member and the spring member and rotatable by the drive force of the spring member upon shutter release to drive the control member at a uniform velocity from the third position to the fourth position, the aperture lever stopping down the aperture in response to the movement of the control member from the third position to the fourth position, metering means including an electromagnetic means for blocking the movement of the control member when the quantity of light transmitted through the aperture being stopped down has reached a predetermined value, and a member adapted to return the control member to said third position after completion of exposure.

The invention will become more fully apparent from the following detailed description thereof taken in conjunction with the accompanying drawings.

DESCRIPTION OF THE PREFERRED EMBODIMENTS

Figure 1:
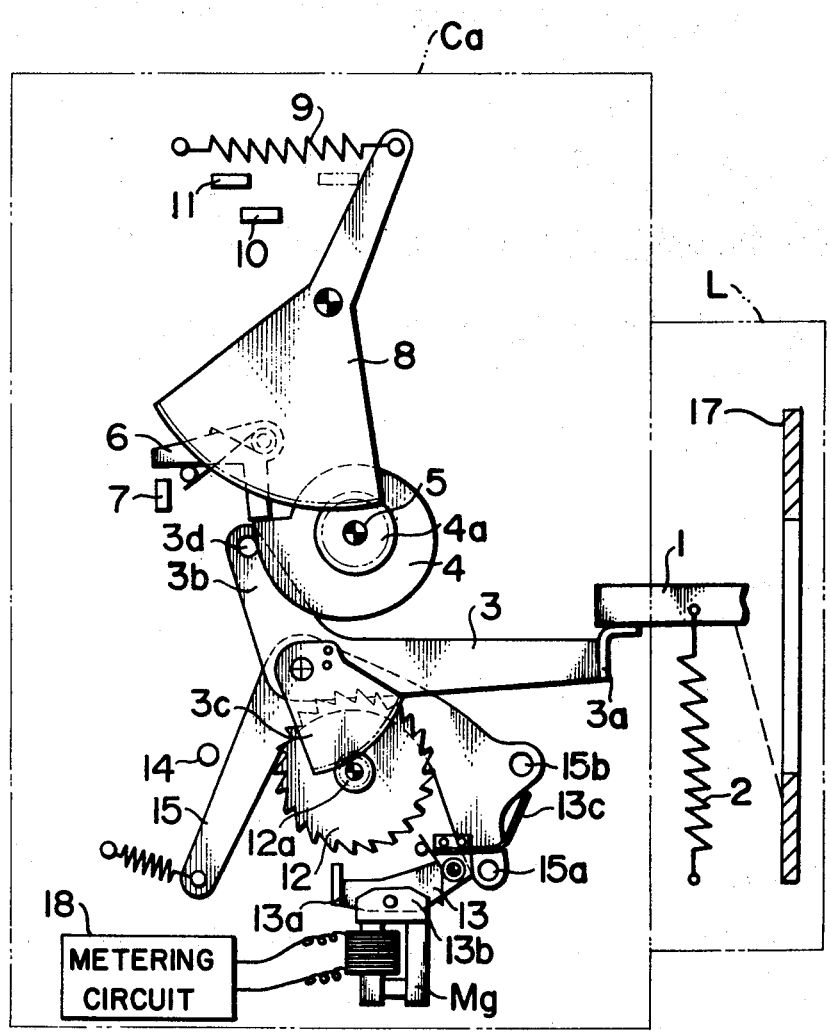
FIG. 1 is a front view of an embodiment of the present invention showing a position in which film advance, shutter charge and mirror charge have been completed.
Figure 2:
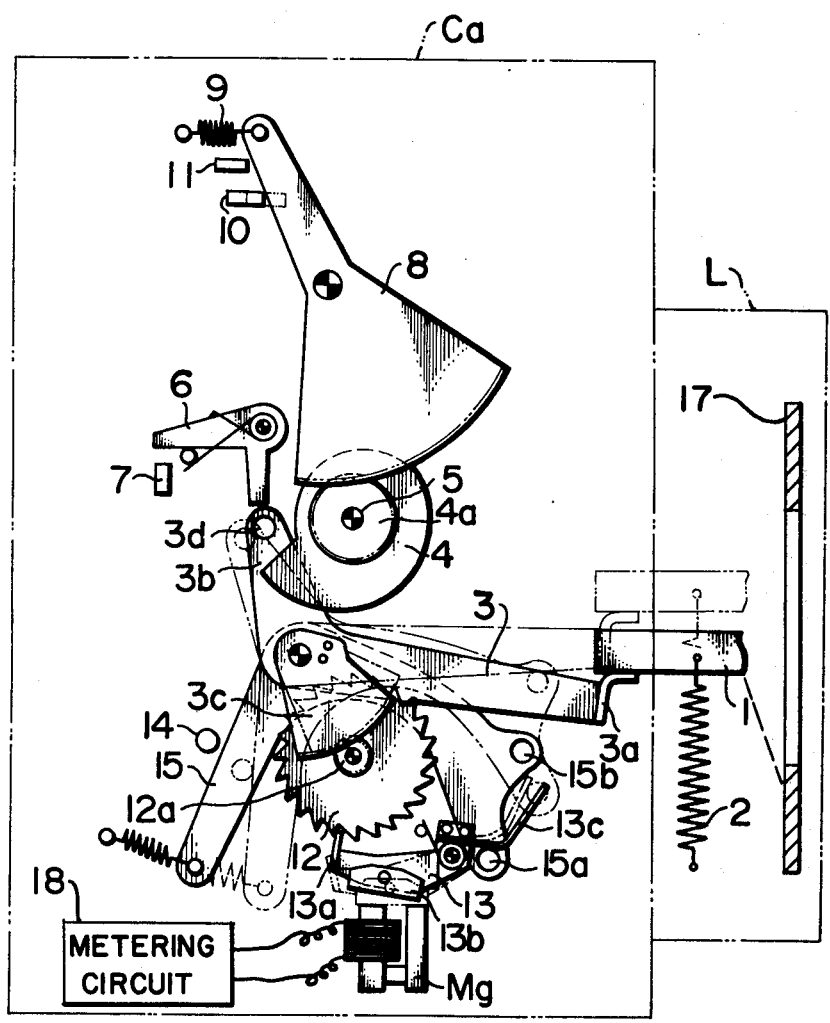
FIG. 2 is a front view showing the device of FIG. 1 in a position in which exposure has been completed.

Referring to FIGS. 1 and 2, Ca is a single lens reflex camera body, and L is a lens barrel mounted to the camera body. An aperture lever 1 is provided within the lens barrel L and movable with an aperture mechanism (not shown) for driving an aperture blade 17 also provided within the lens barrel L. A spring 2 normally biases the aperture mechanism and the aperture blade 17 driven thereby through the aperture lever 1 from an open stop position in a stop down direction. The lens barrel L is of a known construction which can restrain the aperture lever 1 by an aperture value set by operation of an aperture ring (not shown). Turning to Camera body Ca, a control lever 3 is pivotally mounted and has one end 3a for controlling the aperture lever 1 and the other end 3b controlled by a face cam 4. The face cam 4 is provided integrally with a gear 4a and both of these are rotatable on a rotary shaft 5. A release interlocking lever 6, biased counter-clockwise, normally restrains the clockwise rotation of the face cam 4 and releases the restraint by means of a release member 7 actuated in response to the depression of a shutter button (not shown). A sector gear 8 is in mesh-engagement with the aforementioned gear 4a and biased counter-clockwise by a spring 9. An exposure signal lever 10 is operated at the end of rotation of the sector gear 8 and effects the triggering of mirror up and shutter curtain release. A charge lever 11 operates the sector gear 8 in response to the film advance operation and moves the sector gear 8 to its original position (the position of FIG. 1) against the bias of the spring 9. The aforementioned control lever 3 further has a sector gear 3c formed integrally therewith. A gear 12a is in mesh-engagement with the sector gear 3c and movable with a ratchet gear 12. A restraining lever 13 is biased clockwise and a restraining pawl 13a at one end thereof engages ratchet teeth provided on the outer periphery of the ratchet gear 12. A composite electromagnet Mg having a permanent magnet momentarily releases the attraction of an armature 13b provided on a restraining lever 13 when the output of a metering circuit 18 measuring the quantity of light transmitted through the aperture has assumed a predetermined amount, namely, at a point of time whereat the quantity of light transmitted through the aperture has reached a quantity for providing a proper exposure calculated from exposure information such as set shutter speed, film sensitivity, etc. A mirror interlocking lever 14 is interlocked with a known quick return mirror (not shown). A restoration lever 15, biased clockwise, is rotatable counter-clockwise by the mirror interlocking lever 14 with the return of the quick return mirror to its viewing position after completion of exposure. The restoration lever 15 has two pins 15a and 15b provided thereon. With counter-clockwise rotation of the restoration lever 15, the pin 15a on the one hand rotates the restraining lever counter-clockwise 13 through a plate spring 13c provided at the end of the restraining lever 13 while on the other hand the pin 15b upwardly moves the aperture lever 1 against the bias of the spring 2.

Operation will now be described. Description will first be made of the case where the film sensitivity and shutter speed are preset and automatic exposure control is effected by adjusting the aperture. It should be noted that the lens barrel is set to such a condition prior to photography that the aperture can be stopped down to its minimum value. When the shutter button (not shown) is depressed in the position of FIG. 1, the release member 7 pushes up one end of the release interlocking lever 6. Consequently, the release interlocking lever 6 is rotated clockwise and the other end of the lever 6 releases the restraint of the face cam 4. Therefore, the sector gear 8 is rotated counter-clockwise by the spring 9 and in response thereto, the face cam 4 is rotated clockwise. On the other hand, the control lever 3 is biased clockwise by the spring 2, so that the pin 3d bears against the cam surface. In this regard, it is assumed that little or no friction force is created between the outer periphery of the face cam 4 and the pin 3d at the end of the control lever which is in contact with the outer periphery of the cam and that the pin 3d is so disposed as not to cause the face cam 4 to create a rotative force (in fact, in FIGS. 1 and 2, the pin 3d is so designed that the biasing force imparted to the pin 3d by the spring 2 is directed toward the shaft 5 such that no rotative force is created in the face cam 4 by the biasing force of the spring 2). Then, the angle of rotation $\theta$ of the face cam is expressed as:

$$\theta = A(1-\cos\sqrt{(K/M)}\cdot t) \approx A[1-(1-\frac{1}{2}(\sqrt{(K/M)}\cdot t)^2)] = \frac{1}{2}KA/M\, t^2$$

where
A: the charged amount of the spring 9;
M: the inertia of the members 4, 4a, 8 and 9;
K: spring constant of the spring 9;
t: time.

If the radius R of the face cam 4 is set so as to satisfy $$R = R_o - C\sqrt{\theta}$$

where
$R_o$: the maximum radius of the face cam 4;
C: proportion constant, then the control lever 3 will be rotated at a uniform velocity. In the present embodiment, the control lever 3 is so rotated at a uniform velocity by the rotation of the sector gear 8. Of course, by substituting a roller for the pin 3d, it is possible to minimize the friction force created between the roller and the outer periphery of the face cam 4. When the control lever 3 is so rotated clockwise at a uniform velocity, the aperture lever 1 is also moved by the bias of the spring 2 at a uniform velocity from the open aperture position of FIG. 1 toward the stopped down position (in the drawing, downwardly). At the same time therewith, the ratchet gear 12 is also rotated counterclockwise by the sector gear 3c. When the output of the metering circuit 18 for measuring the quantity of light transmitted through the stopped gear aperture reaches a predetermined value, the composite electromagnet Mg is momentarily electrically energized to negate the magnetic force of the permanent magnet to release the attraction of the armature 13b. Accordingly, the restraining lever 13 is rotated clockwise by the spring bias to cause mesh-engagement of the restraining pawl 13a with the ratchet gear 12 and maintain such state. By such mesh-engagement, the control lever 3 and the aperture lever 1 are also stopped. In this manner, the aperture is adjusted to an aperture value for providing a proper exposure. On the other hand, the sector gear 8 still continues to rotate counter-clockwise and at the end of the rotation, it becomes engaged with the exposure signal lever 10 and the mirror is retracted out of the picture-taking light path by an unshown mechanism to permit the shutter curtain to be released. This completes the exposure operation. This condition is shown in FIG. 2. After completion of the exposure operation, the mirror is moved down to its original position, namely, its viewing position, and in response thereto, an unshown mechanism moves the mirror interlocking lever 14 rightwardly downwardly (indicated by dots-and-dash line in FIG. 2). Accordingly, the restoration lever 15 is rotated counterclockwise against the spring bias and the pin 15a pushes up the plate spring 13c, thereby rotating the restraining lever 13 counterclockwise against the spring bias. When the restraining lever 13 is so rotated to return the armature 13b onto the composite electromagnet Mg, the armature 13b is again attracted by the permanent magnet of the composite electromagnet Mg (indicated by dots-and-dash line in FIG. 2). By the counterclockwise rotation of the restoration lever 15, the pin 15b pushes up the control lever 3 and the aperture lever 1 is returned to its open aperture position (indicated by dots-and-dash line in FIG. 2). Thereafter, when winding operation such as film advance, shutter charge, mirror charge, etc. are effected by operating a wind-up lever (not shown), the charge lever 11 is moved rightwardly to rotate the sector gear 8 clockwise against spring bias. With this rotation, the face cam 4 is rotated counter-clockwise and when the maximum radiused portion thereof rides over the release interlocking lever 6, the latter drops into the minimum radiused portion of the face cam 4. Accordingly, the clockwise rotation of the face cam 4 there-after is blocked. In this manner, the winding operation is completed to bring about the position of FIG. 1.

In the above-described device, if, for example, the aperture control device is not of sufficient precision, the aperture cannot sometimes be set accurately to a desired aperture value. To overcome such a disadvantage, the quantity of light transmitted through the aperture after the control of the aperture may be detected to slightly correct the shutter speed, thereby providing a proper exposure accurately. More particularly, after the control of the aperture, for example, the circuit for determining the shutter speed in response to the operation of the sector gear 8 may be operated to correct the shutter speed. Of course, in this case, the quantity of light transmitted through the aperture must be detected and the shutter speed must be determined after the bound of the aperture blade 17 has become quiet and stable condition has been obtained.

Description has so far been made of the case where the shutter speed is preset and the aperture control is effected in accordance therewith. Description will now be made of the operation in a case where photography is carried out with the shutter speed and the aperture preset to their desired values. First, the shutter speed and the aperture value are set by means of a shutter dial and an aperture ring, both not shown. Of course, by a change-over device (not shown), the composite electromagnet Mg is maintained in its inoperative condition (namely, the condition in which the armature 13*b* is attracted). Accordingly, when the shutter button (not shown) is depressed in the position of FIG. 1, the release member 7 operates the release interlocking lever 6 to rotate the face cam 4 clockwise, and the control lever 3 moves the aperture lever 1 from its open aperture position in its stopped down direction. What has hitherto been described is the same as previously described. However, the aperture lever 1 is stopped at a desired aperture value set by operation of the aperture ring. Of course, in the same manner as previously described, the section gear 8 still continues to rotate counter-clockwise to operate the exposure signal lever 10, thereby effecting exposure operations such as mirror up, shutter curtain release, etc. After completion of the exposure operations, the mirror is moved down, whereupon the mirror interlocking lever 14 rotates the restoration lever 15 counter-clockwise and the pin 15*b* returns the control lever 3 and the aperture lever 1 to their original positions (FIG. 1). If the wind-up lever (not shown) is operated thereafter, the winding operation takes place to represent the condition of FIG. 1.

In the embodiment hitherto described, the mirror is moved up out of the picture-taking light path after the control of the aperture. However, it is within the scope of the invention to control the aperture after the mirror has been moved up. In that case, design is made such that the aforementioned release member 7 pushes up the end of the release interlocking lever 6 after the mirror has been moved up by depression of the shutter button and that the exposure signal lever 10 effects only the releasing action of the shutter curtain by the sector gear 8.

Figure 3:
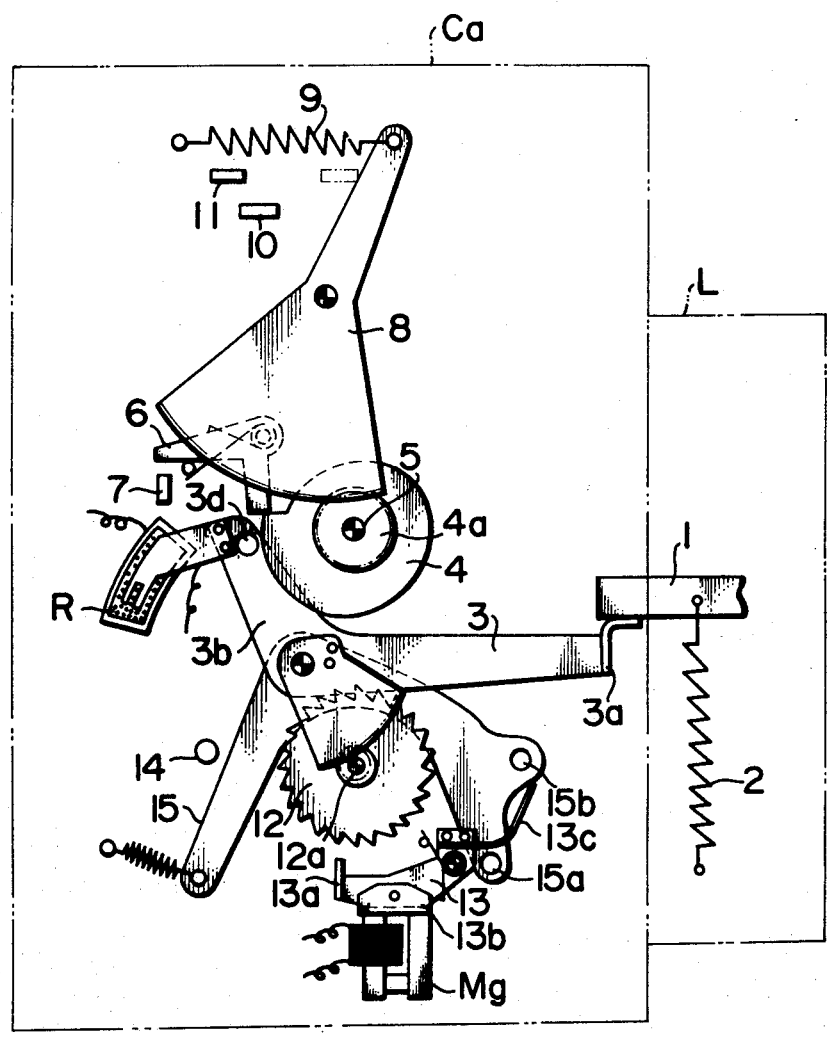
FIG. 3 is a front view of another embodiment of the present invention.

Description has hitherto been made of an embodiment of the type in which the quantity of light transmitted through the aperture is detected, but the present invention is equally applicable to the type in which the displacement of the control lever is detected. The embodiment shown in FIG. 3 is such that a reference resistance value corresponding to the aperture value for providing a proper exposure from a preset film sensitivity and shutter speed is set by an unshown circuit and after depression of the shutter button, the control lever 3 is moved to electrically energize the composite electromagnet Mg when the value of a variable resistor R in the circuit has become coincident with the aforementioned reference resistance value. In the other points, the embodiment of FIG. 3 is identical with the embodiment of FIGS. 1 and 2 of the type in which the quantity of light is detected, and need not further be described. Of course, in this embodiment, the aperture control and the mirror up can take place at the same time.

We claim:

1. An aperture control device in a camera having mounted thereon a lens having
   (a) an aperture mechanism including an aperture blade and determining the aperture by varying the position of said aperture blade;
   (b) an aperture lever connected to said aperture mechanism and displaceable between a first position for rendering said aperture blade to an open aperture and a second position for rendering said aperture blade to a minimum aperture; and
   (c) a member for biasing said aperture lever toward said second position; said aperture control device comprising:
   (d) a control member engaged with said aperture lever and movable between a third position and a fourth position corresponding to said first position and said second position, respectively;
   (e) a spring member storing a drive force by shutter charge and giving forth the stored drive force by shutter release;
   (f) a cam member disposed between said control member and said spring member and rotatable by the drive force of said spring member upon shutter release to drive said control member at a uniform velocity from said third position to said fourth position, said aperture lever stopping down the aperture in response to the movement of said control member from said third position to said fourth position;
   (g) metering means including an electromagnetic means for blocking the movement of said control member when the quantity of light transmitted through the aperture being stopped down has reached a predetermined value; and
   (h) a member adapted to return said control member to said third position after completion of exposure.

2. An aperture control device according to claim 1, wherein said control member includes a first end portion bearing against the cam surface of said cam member and a second end portion engaged with said aperture lever, said first end portion bearing against said cam surface of said cam member so that the biasing force transmitted to said first end portion through said aperture lever and said second end portion is directed substantially toward the center of rotation of said cam member.

* * * * *